United States Patent
Ukkola et al.

(10) Patent No.: US 9,729,613 B2
(45) Date of Patent: Aug. 8, 2017

(54) METHOD, APPARATUS AND SYSTEM FOR USE IN A WEB SERVICE

(71) Applicant: SENSINODE OY, Oulu (FI)

(72) Inventors: Sampo Ukkola, Oulu (FI); Zachary Shelby, Oulu (FI); Mikko Saarnivala, Oulu (FI)

(73) Assignee: ARM FINLAND OY (FI)

( * ) Notice: Subject to any disclaimer, the term of this patent is extended or adjusted under 35 U.S.C. 154(b) by 637 days.

(21) Appl. No.: 13/942,733

(22) Filed: Jul. 16, 2013

(65) Prior Publication Data

US 2014/0025742 A1    Jan. 23, 2014

(30) Foreign Application Priority Data

Jul. 17, 2012 (FI) ..................... 20125797

(51) Int. Cl.
- *H04W 60/00* (2009.01)
- *H04W 4/02* (2009.01)
- *H04L 29/08* (2006.01)
- *H04W 4/00* (2009.01)

(52) U.S. Cl.
CPC ............ *H04L 67/10* (2013.01); *H04L 67/125* (2013.01); *H04W 4/005* (2013.01)

(58) Field of Classification Search
CPC ....... H04L 67/10; H04L 67/125; H04W 4/005
USPC ........................................................ 709/204
See application file for complete search history.

(56) References Cited

U.S. PATENT DOCUMENTS

| | | | |
|---|---|---|---|
| 7,647,415 B1 * | 1/2010 | Sandoz | H04L 69/04 709/230 |
| 8,069,470 B1 * | 11/2011 | Montenegro | H04L 63/065 726/3 |
| 2005/0071448 A1 | 3/2005 | Katz et al. | |
| 2005/0074018 A1 | 4/2005 | Zintel et al. | |
| 2005/0228763 A1 * | 10/2005 | Lewis | G06Q 10/06 706/1 |
| 2005/0262418 A1 * | 11/2005 | Gehrmann | H04L 9/0841 714/758 |
| 2006/0092861 A1 * | 5/2006 | Corday | H04L 67/34 370/256 |
| 2007/0067421 A1 | 3/2007 | Angelov | |

(Continued)

OTHER PUBLICATIONS

CoRE Internet-Draft, CoRE Resource Directory, draft-shelby-core-resource-directory-04, Jul. 16, 2012, Internet Engineering Task Force.

(Continued)

*Primary Examiner* — Kevin Bates
*Assistant Examiner* — Mark A Scott
(74) *Attorney, Agent, or Firm* — Barnes & Thornburg LLP

(57) ABSTRACT

A method and apparatus for realizing a web service. The apparatus having binary web service interface to communicate with nodes operationally connected to the apparatus using a binary web service, the nodes having one or more resources, the binary web service interface receives from a node a registration message including information on the address of the node, a flag indicating that at least part of the resources of the node are defined in a template, and a node type identification; a second interface for retrieving template information on the basis of the node type identification and a resource component for storing information on nodes, node addresses, node resources and template information.

27 Claims, 3 Drawing Sheets

(56) References Cited

U.S. PATENT DOCUMENTS

| | | | |
|---|---|---|---|
| 2007/0192329 A1* | 8/2007 | Croft | G06F 3/1415 |
| 2007/0210916 A1* | 9/2007 | Ogushi | G06Q 10/0875 340/531 |
| 2007/0299624 A1* | 12/2007 | Motobayashi | H04L 63/0428 702/117 |
| 2008/0010631 A1* | 1/2008 | Harvey | G06F 8/60 717/131 |
| 2008/0208367 A1* | 8/2008 | Koehler | G01D 3/08 700/19 |
| 2009/0141666 A1* | 6/2009 | Jin | H04B 7/2606 370/315 |
| 2009/0172005 A1* | 7/2009 | LaToza | G06F 17/248 |
| 2010/0125641 A1* | 5/2010 | Shelby | H04L 67/16 709/206 |
| 2011/0019583 A1* | 1/2011 | Zelenov | H04W 48/14 370/254 |
| 2011/0055671 A1* | 3/2011 | Kim | G06F 11/1028 714/800 |
| 2011/0270895 A1* | 11/2011 | Shelby | G06F 17/2252 707/803 |
| 2012/0021770 A1* | 1/2012 | Naqvi | G06F 17/3087 455/456.3 |
| 2012/0047551 A1* | 2/2012 | Pattar | H04W 4/00 726/1 |
| 2012/0203491 A1* | 8/2012 | Sun | G06F 19/3406 702/108 |
| 2012/0310599 A1* | 12/2012 | Tanaka | A01B 79/005 702/189 |
| 2013/0090745 A1* | 4/2013 | Frazer | G05B 15/02 700/12 |
| 2013/0097317 A1* | 4/2013 | Sheleheda | H04W 4/005 709/225 |
| 2013/0232255 A1* | 9/2013 | Fukui | H04L 43/10 709/224 |
| 2013/0273855 A1* | 10/2013 | Cherian | H04W 4/005 455/68 |
| 2013/0332996 A1* | 12/2013 | Fiala | G06F 21/53 726/4 |
| 2014/0126581 A1* | 5/2014 | Wang | H04W 4/001 370/431 |
| 2015/0088982 A1* | 3/2015 | Johnson | H04L 67/34 709/203 |
| 2015/0220076 A1* | 8/2015 | Uchida | G05B 19/05 700/97 |

OTHER PUBLICATIONS

Finnish Search Report dated May 17, 2013 for Finnish Patent Application No. 20125797.

* cited by examiner

METHOD, APPARATUS AND SYSTEM FOR USE IN A WEB SERVICE

PRIORITY CLAIM

This patent application claims priority to Finnish Patent Application No. 20125797, filed 17 Jul. 2012, the disclosure of which is incorporated herein by reference in its entirety.

FIELD

Disclosed embodiments relate to a method, an apparatus and a system for use in a web service. In particular, disclosed embodiments relate to web services in networks comprising machine-to-machine systems.

BACKGROUND

The following description of background art may include insights, discoveries, understandings or disclosures, or associations together with disclosures not known to the relevant art prior to the present disclosed embodiments but provided by the disclosed embodiments. Some of such contributions may be specifically pointed out below, whereas other such contributions will be apparent from their context.

In modern communication and computer networks, management of network infrastructure equipment, such as personal computers, servers and printers, is an important part of the operation of the network. In a large network comprising tens and hundreds of devices the management of devices requires a systematical approach to be efficient or even possible. Today, the management of infrastructure is performed using standards like the Simple Network Management Protocol (SNMP) and Netconf. These protocols enable the monitoring and possible control of devices connected to the network in a controlled and efficient manner. These methods work well in an Ethernet-based office information technology (IT) environment comprising devices having processor power. Power consumption, traffic overhead and implementation complexity are not a concern in this environment.

Enterprises are rapidly connecting machine-to-machine (M2M) systems into their backend IT infrastructure for e.g. energy monitoring, remote machine monitoring, building automation and asset management. M2M systems often include very simple, cheap, battery powered devices connected via deep low-bandwidth access networks. The scale of devices in an M2M network is also massively different, including even up to millions of devices in a single management domain.

Traditional IT system network management solutions and existing protocols like SNMP are too inefficient and complex to managing M2M systems end-to-end.

Prior art machine-to-machine systems have solved this problem by building monolithic, vertical technology all the way from the device to the backend server, often employing proprietary protocols. ISO/IEC 14908-based protocol (LONtalk) is an example of such a system. ISO stands for International Organization for Standardization and IEC for the International Electrotechnical Commission.

More recently, as machine-to-machine devices have become IP enabled, systems have become more open by using IP as a networking protocol, but in order to keep the system efficient, they employ proprietary protocols.

Finally, some devices are starting to be connected to the web; however this is now done using standard HTTP/TLS/TCP technology, which is not suitable for constrained devices or networks. Here HTTP is the Hypertext Transfer Protocol, TLS Transport Layer Security and TCP the Transmission Control Protocol.

These solutions are not designed for a large numbers of devices with small processing power and minimum power consumption.

SUMMARY

Disclosed embodiments provide an improved solution for managing M2M systems and registering resources offered by M2M devices.

At least one disclosed embodiment provides an apparatus, comprising a binary web service interface to communicate with nodes operationally connected to the apparatus using a binary web service, the nodes comprising one or more resources, the binary web service interface being configured to receive from a node a registration message comprising information on the address of the node, a flag indicating that at least part of the resources of the node are defined in a template, and a node type identification; a second interface for retrieving template information on the basis of the node type identification and a resource component for storing information on nodes, node addresses, node resources and template information.

Another disclosed embodiment provides an apparatus, comprising one or more interfaces to resources configured to provide information; a binary web service interface to communicate with a network element operationally connected to the apparatus using a binary web service, the apparatus being configured to send the network element a registration message comprising information on the address of the apparatus, a flag indicating that at least part of the resources of the apparatus are defined in a template, and a node type identification.

Yet another disclosed embodiment provides a method, comprising communicating with nodes operationally connected to the apparatus using a binary web service interface, the nodes comprising one or more resources, receiving from a node a registration message comprising information on the address of the node, a flag indicating that at least part of the resources of the node are defined in a template, and a node type identification; retrieving template information on the basis of the node type identification and storing information on nodes, node addresses, node resources and template information in a resource component.

Still another disclosed embodiment provides a method, registering resources configured to provide information; communicating with a network element operationally connected to the apparatus using a binary web service, sending the network element a registration message comprising information on the address of the apparatus, a flag indicating that at least part of the resources are defined in a template, and a node type identification.

BRIEF DESCRIPTION OF THE DRAWINGS

Disclosed embodiments are described below, by way of example only, with reference to the accompanying drawings, in which.

DETAILED DESCRIPTION OF THE DISCLOSED EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Data exchange between programs and computers is a vital element. Different programs, computers and processors may exchange data without human intervention. Different networks and protocols are used in different environments. On the Internet, the Transmission Control Protocol/Internet Protocol (TCP/IP) is the basic protocol used in communication. TCP/IP takes care of assembling and disassembling the data to be transmitted in packets. IP handles the addressing so that packets are delivered to the correct destination. Above TCP/IP, the Hypertext Transfer Protocol (HTTP) is used as a client/server protocol. A program may send an HTTP request to a server which responds with another HTTP message.

The exchanges of interoperable messages using APIs (Application Program Interfaces) provided by servers on the Internet are realized by using web services. A web service can be realized in many ways, usually by using a REST (Representational State Transfer) design with the built-in features of a web protocol like HTTP and payload encoding with Extensible Markup Language (XML), or realized as a remote procedure call via SOAP (Simple Object Access Protocol).

Low-power wireless networks, such as IEEE 802.15.4 based embedded and sensor networks, have extremely limited resources for transmitting packets. These networks are very energy-efficient, and the chip technology is cheap. For this reason the technology is making its way to embedded devices very quickly for automation, measurement, tracking and control, for example.

In low-power wireless networks, current web service technologies are far too complex (headers, content parsing) and heavy (large header and content overhead). Recently, binary web service protocols have been developed for low-power wireless networks. A binary web service solution includes the use of a suitable web service protocol (such as simplified HTTP or a binary web service protocol such as Constrained Application Protocol CoAP) and an efficient content encoding (such as Efficient XML Interchange EXI, Binary XML or Fast Infoset FI).

Figure 1:
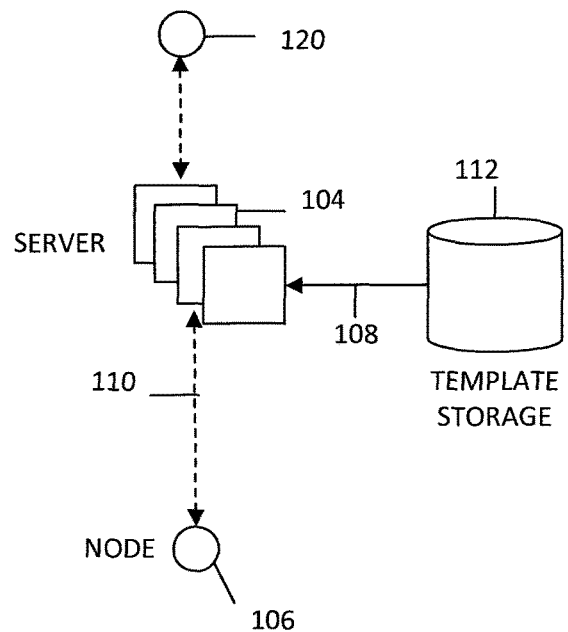
FIG. 1 illustrates an example of a system architecture.

FIG. 1 illustrates an example of a web service system architecture to which disclosed embodiments may be applied. In at least one disclosed embodiment, the system is configured to efficiently enable one or more backend web applications 120 to make use of constrained embedded nodes 106 over constrained networks 110. The communication is based on IP and a RESTful web service architecture end-to-end, for example.

The architecture consists of a server or servers 104, which hosts backend components of the system. Such a server can be realized on anything from a standard personal computer (PC) to a server cloud. The server components can be located on the same apparatus, or distributed across a cluster. Disclosed embodiments are designed to scale from small M2M systems (1000s of nodes) to very large M2M systems (100s of millions of nodes).

The server 104 may provide a web service interface to web applications 120 that make use of embedded node resources. The web application may be an application run in a browser or in standalone software. The application or software may be run in an apparatus capable of Internet communication. The server 104 is configured to communicate using optimized embedded web service algorithms and protocols with nodes 106 over the M2M interface 110. In another disclosed embodiment, the functions of this interface include registration and resource requests. The architecture includes the ability to cluster the backend server across multiple physical or virtual machines (called private or public cloud computing).

In at least one disclosed embodiment, a local proxy component (not shown) may be utilized between the server 104 and the nodes 106 to distribute parts of the intelligence of the server to the edges of the architecture.

The system further comprises a storage entity 112 which may be a database, another web server, or a storage drive. The storage 112 may be a separate apparatus, integrated in the server, or a combination of these. The server communicates with the storage 112 using an interface 108.

The constrained nodes 106 in the system have limited memory and processing capabilities, may sleep most of the time, and often operate using a constrained network technology. Nodes communicate with servers 104 using an M2M interface 110. Each node contains resource registration related functionality. The nodes comprise one or more resources which may be utilized by the web applications 120, for example.

The embedded M2M devices or nodes 106 that are being managed by the server 104 can be connected to the server via IP directly (or via a proxy). The interface 110 between the node and the server is realized using a binary web service protocol over IP. The M2M devices 106 may reside in a constrained network over which traditional management protocols would be too inefficient. The constrained or low-power wireless network may be a multihop network comprising a set of wireless low-power nodes. In this simplified example, one node 106 is illustrated.

In another disclosed embodiment, the wireless links in the wireless network 110 may be realized by using IEEE 802.15.4, with Internet Protocol v6 (6lowpan), IEEE 802.15.4 with ZigBee, Bluetooth or Bluetooth Ultra Low Power (ULP), Low Power Wireless Local Area Network, proprietary low-power radio, cellular radio system or any other system suitable for low-power transmission. IEEE stands for the Institute of Electrical and Electronics Engineers.

Figure 2:
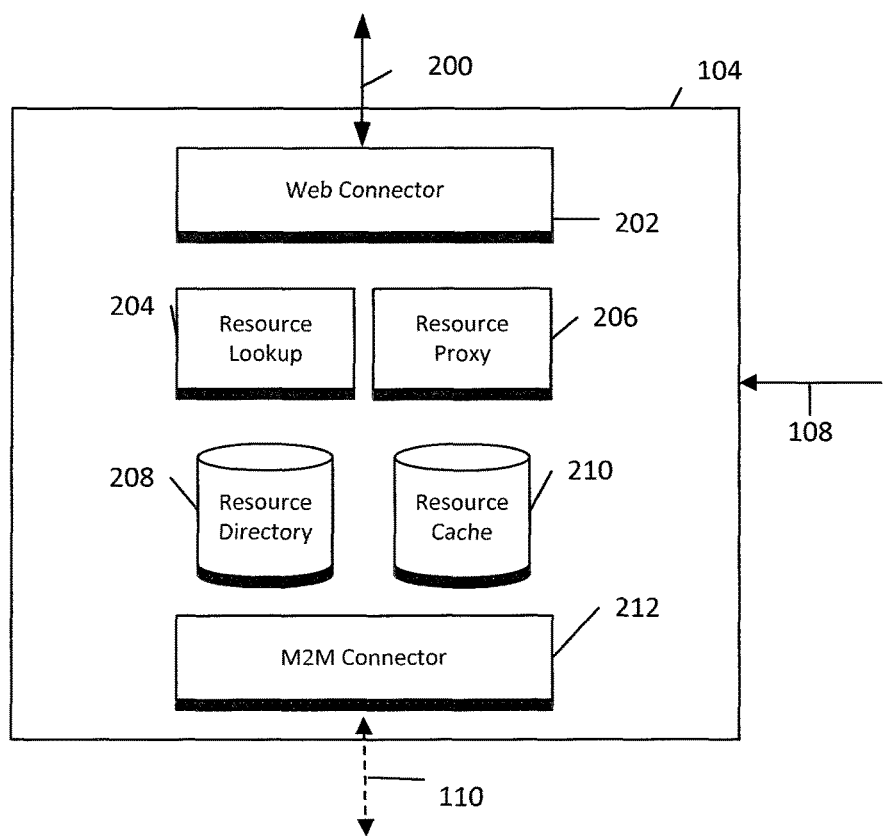
FIG. 2 illustrates an example of a server.

FIG. 2 illustrates an example of a server 104. The server may consist of several components. The server may be used by one or more web applications over a web interface 200. The interface 200 is typically realized over HTTP with XML or JSON payload content where JSON (JavaScript Object Notation) is a known data-interchange format. Mentioned realizations are merely examples as the architecture of the server is transparent to payload type. Interaction of the web applications with the server over the interface uses the REST paradigm. Alternative protocols may be supported, e.g. JMS (Java Message Service) for communication with enterprise Java components, or CoAP when efficiency is needed e.g. when communicating with mobile devices. In at least one disclosed embodiment, the server may comprise a Web Connector 202 for each protocol supported by the interface. The Web Connectors realize abstract REST interfaces used by the other server components to access the different protocols available. This makes it possible for to support a new protocol without changing other server components.

The communication with constrained nodes 106 are realized in the server using an M2M interface 110, realized using embedded web services (binary web protocol and payload) for example with the CoAP protocol. Other protocols such as SMS or optimized HTTP are also supported. In another disclosed embodiment, each protocol interface is realized in the server using an M2M Connector 212. The Web Connectors 202 and M2M Connectors 212 may be realized using a processor and a storing device such as a hard disc drive and a suitable application, for example.

The server further comprises a Resource Directory 208. The server is configured to receive registrations of constrained nodes or end-points 106 operationally connected to the server. The nodes and their web resources (path) along with other meta-data are registered with the Resource Directory either directly by the node, via a local proxy or by another third party. Thus, the Resource Directory is a registry of the resources below the server in the M2M network. This way the Resource Directory eliminates the need for management tools to probe the M2M network directly (which is very inefficient). The Resource Directory may be realized using a processor and a storing device such as a hard disc drive and a suitable application, for example. The Resource Directory may be realized as a database application in a computer or it may be realized using cloud computing.

In at least one disclosed embodiment, the server further comprises a Resource Cache 210. The Resource Cache is a temporary cache of the most recent representation (latest payload value) of node resources. The cache 210 is accessed any time the server receives a request for a resource. The cache is updated any time a response is made or a notification as a result of a subscription is received. This caching improves efficiency as subsequent requests for that resource are fetched internally rather than loading the constrained M2M network. The Resource Cache may be realized as an application in a computer or it may be realized using cloud computing.

In another disclosed embodiment, the server comprises a Resource Lookup 204 which is configured to provide a lookup interface for web applications and other internal components to discover end-points and resources. A web application or internal component may send a lookup request to the server and the Resource Lookup 204 is configured to handle these requests and reply with necessary information. With the knowledge of the domain, the end-point and a resource a web application or internal component can make a resource request. These requests are handled by a Resource Proxy 206 and the Resource Cache 210. The Resource Proxy is first configured to check if a local cached copy of the requested resource is available. If a valid copy is found, it may be sent as a reply. If the cache does not have a copy of the resource it is requested from the node via an M2M Connector 212. The Resource Lookup and Resource Proxy may be realized using a processor and a storing device such as a hard disc drive and a suitable application, for example. They may be realized as applications in a computer or using cloud computing.

The server further comprises an interface 108 to a storage entity or apparatus configured to store templates and other information.

Figure 3:
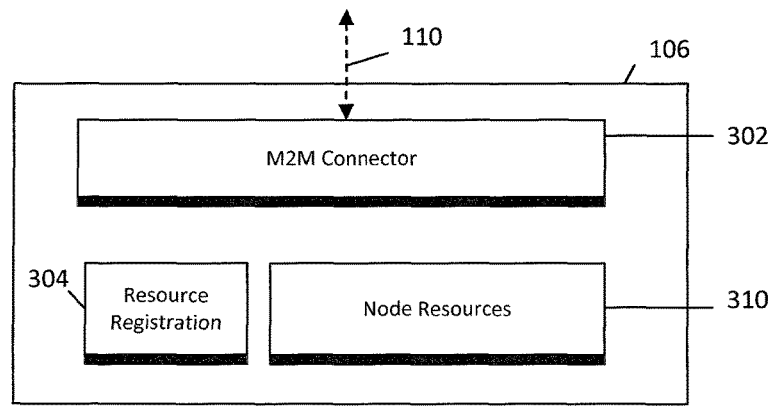
FIG. 3 illustrates an example of a node.

FIG. 3 shows an example of the structure of a node 106. A node has one or more device interfaces or device applications, each registering resources with the Node Resources component 310. When the resources have been registered, the Resource Registration component 304 discovers the location of a Resource Directory for its appropriate domain (usually a server) and then registers itself and its resource over the M2M interface 110 using the M2M Connector 302.

Node or nodes may have resources of different types registered. A basic type of resource is one which may have a given value. A web application may request the node the value, the value is read and reported back to the web application typically immediately after receiving the request.

In at least one disclosed embodiment, resources to be managed on a node are represented as web resources. Resources of the nodes may be defined as Uniform Resource Identifier web resource structure. A web resource is identified by a Uniform Resource Locator (URL). A Uniform Resource Locator is a Uniform Resource Identifier (URI) that specifies where a resource is available and the mechanism for retrieving the resource. An example of an URL is the address of a web page on the World Wide Web, such as http://www.example.com/.

Physically, a node may comprise a processor, a memory, a power source, a transceiver or a communication unit and physical interfaces to the resources. The resources may be realized with different techniques depending on the application. The resources may be realized using sensors, light sources, detectors, to name a few.

The nodes 106 of the system are configured to register their resources with the Resource Directory of a server 104. In at least one disclosed embodiment, the registration is performed using a REST interface containing query parameter meta-data and a body with a link description for each resource. The server stores the end-point, its resources and associated meta-data in the Resource Directory 210. Once the data is in the Resource Directory the data can be looked up and resources requested.

As the use of M2M networks increase the complexity of nodes or end points also increases. The number of web resources used to model all functionalities of an end point increases quickly. Where a simple device may have only few resources a complex device can easily have more than 50 resources. When a device registers with a Resource Directory, it is presently configured to send a link representation of each resource in the payload of the registration. With many resources, the size of the registration message becomes a problem for system capacity, especially when many devices register at the same time.

In another disclosed embodiment, the node registration overhead is reduced by making use of semantic naming of nodes when many nodes in a system host mostly the same resources. For example, the majority of lights in a street lighting system have the same set of resources when registering. Some lights may have some extra resources that other lights of that type do not have.

To simplify the registration procedure and reduce the traffic due to registration, the use of resource templates in the backend component of the M2M network are proposed. A template is associated with a semantic node type. In yet another disclosed embodiment, a template defines the list of resources that are automatically populated in the Resource Directory each time that node type registers. A flag is used by the node in the registration message to indicate that it wants template-based registration enabled. Additional dynamic resources can be registered by a node by including those resources in the registration as links. Such resources are added to the Resource Directory in addition to those resources already populated from the template.

Figure 4:
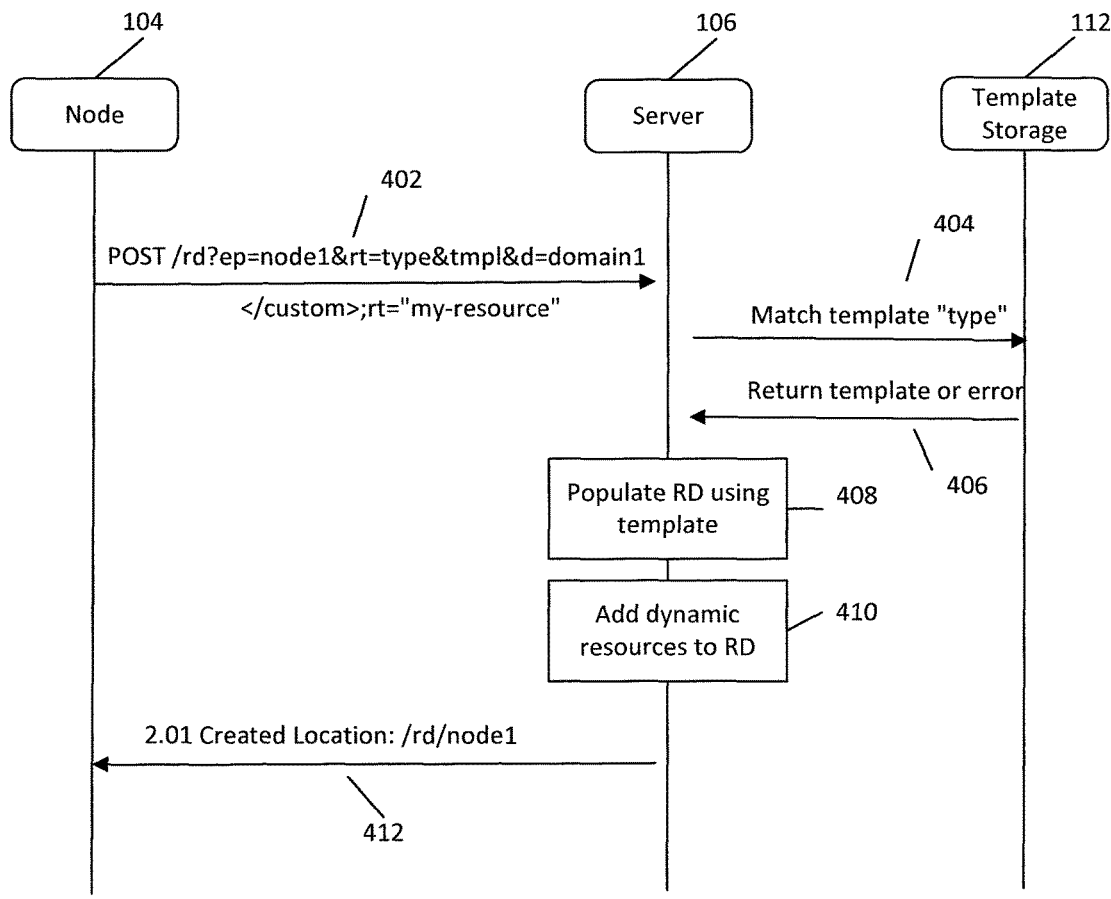
FIGS. 4 and 5 show examples of message exchange diagrams of a node registration procedure.

FIG. 4 illustrates an example of the registration of a node. The figure shows a registration message exchange diagram between a node 104, a server 104 and a storage entity 112.

When installed and powered up, a node is configured to register itself to a network. It sends a registration message 402 to the server 106. An example of the message is as follows:

POST/rd?ep=node1&rt=type&tmpl&d=domain1</custom>;rt="my-resource"

In at least one disclosed embodiment, the node includes two pieces of information in the query string of the registration message. The first is a template flag ("tmpl" in the above example), which indicates that the node would like the server to apply a template for its resources. The second is the node type identification or the semantic node type ("type" in this example), which is then used to match the template. Finally, if the node has custom resources in addition to those in the template, they are included as links with the registration (/custom in this example).

When the Resource Directory of the server 106 receives such a registration, it makes an enquiry 404 to the template storage 112 for that template. The enquiry comprises the node type identification. The storage 112 is configured to return 406 an error if no matching template is found in the storage. In such a case, the server informs the node about the error. The node is configured to register again without using a template flag. If a matching template is found, the storage is configured to send 406 information on the template back to the server. The server is configured to parse the information on the template and update 408 the Resource Directory. Furthermore, if the registration message included custom resources, the custom resources are included 410 with the registration. Finally, if successful, an appropriate response is sent 412 back to the node.

In at least one disclosed embodiment, the Resource Directory stores in step 408 information on the resources defined in the template. However, the Resource Directory may conserve space and store only a pointer to the template. This is useful especially if the number of nodes utilizing the template is large.

Whenever detailed information on the resources of the node is needed the Resource Directory may retrieve the information from the storage 112 by utilizing the pointer. For example, the server may receive a request or query regarding the resources of a node. The server may be configured to retrieve the template defining the resources of the node from the storage on the basis of the pointer to the template stored in the Resource Directory. The server determines the resources from the template and other information stored in the Resource Directory, and responds to the request or query.

In another disclosed embodiment, when a node sends a registration message with a template flag to a server which does not support templates, the server may be configured to respond by sending a message to the node that templates are not supported. In such a case, the node is configured to register again without using a template flag.

In yet another disclosed embodiment, the templates are defined using JSON. However, other methods may be used as well. Below is an example of a template in a JSON format:

```
{
  "endpoint":[
    {
      "endpoint-type":"LocationSensor",
      "resource":[
        {
          "resource-id":"90",
          "path":"/gps/loc",
          "type":"ns:gpsloc",
          "observable":"auto"
        },
        {
          "resource-id":"93",
          "path":"/fw/devtype",
          "type":"ns:devtype",
          "observable":"no"
        }
      ]
    }
  ]
}
```

The above template is for an end point or node type "LocationSensor". The template defines two resources of the node type, the resources having resource types 90 and 93. The path, type and some properties of the resources are included in the definitions.

In addition to basic resource information, a template can also contain information about the behavior of resources, for example thresholds on which data is sent, units and other interaction model information.

In still another disclosed embodiment, an additional mechanism for reducing the overhead of the registration URI itself is proposed. The registration message sent by a node comprises several fields that are required but which are fairly static information that is simply matched by the server. A mechanism is proposed that represents these static fields as a one-way hash function. Fields useful for this mechanism include the domain, the node type and template flag, for example.

In general, a registration message comprises parameters of first type which have no value to be stored in the server but which are only matched in the server against some predetermined value. A second type of parameters is those which have a value which the server must store. Examples of parameters of the second type include node name and lifetime. Hashing is suitable for the first type of parameters.

Figure 5:
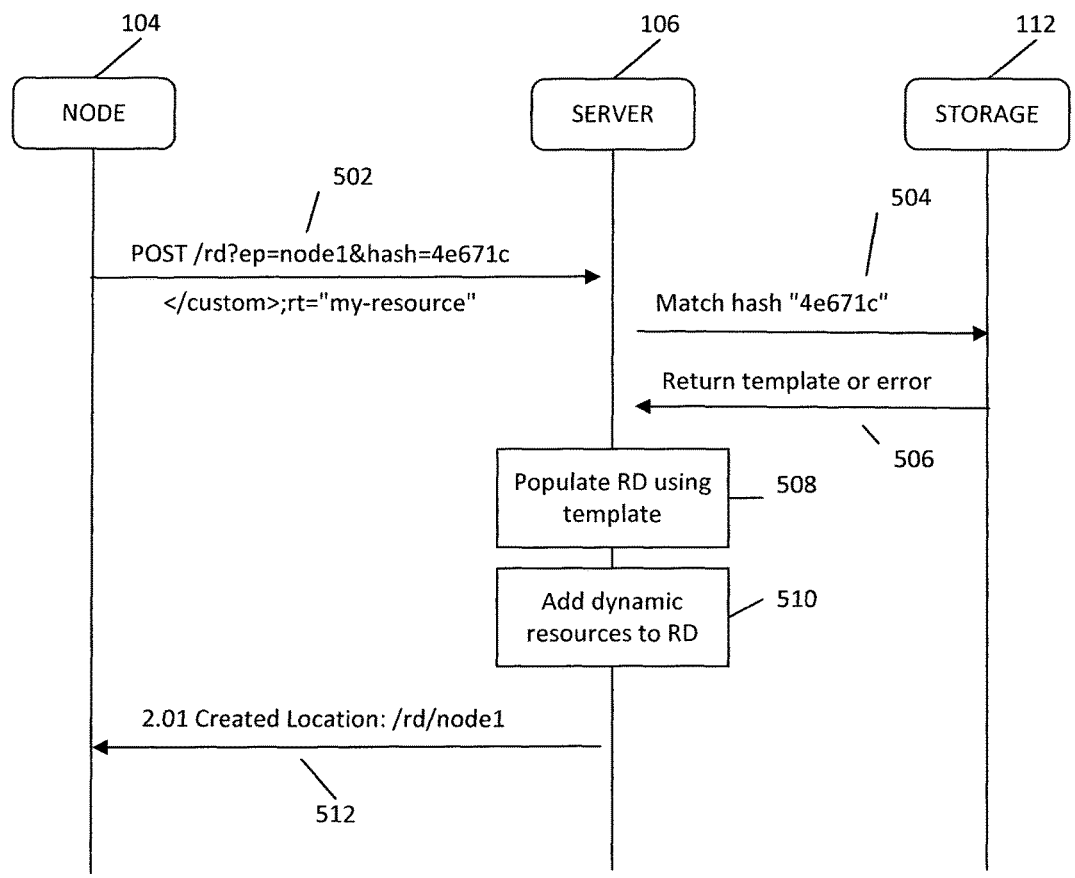

FIG. 5 illustrates an example of the registration of a node. The figure shows a registration message exchange diagram between a node 104, a server 104 and a storage entity 112.

When installed and powered up, a node is configured to register itself to a network. It sends a registration message 502 to the server 106. An example of the message is as follows:

POST/rd?ep=node1&hash=4e671c</custom>;rt="my-resource"

In at least one disclosed embodiment, instead of including in the message static information (which is simply matched in the server) such as the domain, end-point type and template flag as query parameters, a single hash is taken over those parameters and included in the message 502. In the above example, the hash is included as "&hash=4e671c". When the server 106 receives the hash, it is configured to send 504 the hash to the storage 112 where the hash is compared against pre-calculated hashes of those parameters. The storage responds by sending 506 the unhashed information to the server. If the hash included a template flag, the storage may return a pointer to the template. Otherwise the process is the same as in FIG. 4. Thus, actions 508, 510 and 512 correspond to actions 408, 410 and 412.

In another disclosed embodiment, the hash is calculated using any one-way hash function that is then truncated to a suitably short length to be efficient. A non-limiting example of a suitable length is 32 bits.

In yet another disclosed embodiment, the query string parameters of the registration message are first normalized as UTF-8, 8-bit Universal character set Transformation Format, which is a character set utilizing Unicode characters. After normalization, the parameters are then combined into a string in a predetermined order, for example:

param1=value1¶m2=value2&param2=value2

The hash function is then calculated over this string, and then truncated. The node may perform the hash operation on the fly during the preparation of the registration message or the hash may have been pre-calculated.

On the server side, hashes are pre-calculated in the same way and stored in the storage 112. In another disclosed embodiment, hashes are calculated for all known combination of parameters. If known parameters change, for example if a new domain is added, the hashes may be recalculated as needed.

In still another disclosed embodiment, the apparatus implementing aspects of the disclosed embodiments may be realized as software or a software module in a node, a server, a computer or a set of computers connected to Internet and a binary web service domain directly or via a proxy router or server.

The software, software module or computer programs may be in source code form, object code form, or in some intermediate form, and it may be stored in some sort of carrier, which may be any entity or device capable of carrying the program. Such carriers include a record medium, computer memory, read-only memory, and software distribution package, for example. Depending on the processing power needed, the computer program may be executed in a single electronic digital controller or it may be distributed amongst a number of controllers.

It will be obvious to a person skilled in the art that, as technology advances, the inventive concept can be implemented in various ways. The disclosed embodiments are not limited to the examples described above but may vary within the scope of the claims.

The invention claimed is:

1. An apparatus comprising:
   a binary web service interface to communicate with nodes operationally connected to the apparatus using a binary web service, the nodes comprising one or more resources, the binary web service interface being configured to receive, from a node, a node registration message comprising:
      information indicating the address of the node sending the node registration message,
      a flag indicating that at least part of the resources of the node sending the node registration message are defined in a template, and that a template-based node registration is requested, and
      a node type identification for retrieving a template for the requested template-based node registration;
   a second interface for retrieving template information based on the node type identification included in the requested template-based node registration; and
   a resource component for storing information on nodes, node addresses, node resources and template information.

2. The apparatus of claim 1, wherein node registration message further comprises information on additional resources not defined in a template.

3. The apparatus of claim 1, wherein the apparatus is configured to:
   request using the template information retrieved via the second interface from a storage connected to the second interface based on the node type identification after receiving the node registration message;
   receive a pointer to the template stored in the storage; and
   store the pointer to the template in the resource component.

4. The apparatus of claim 1, wherein the apparatus is configured to:
   request using the template information retrieved via the second interface from a storage connected to the second interface based on the node type identification after receiving the node registration message;
   receive template information stored in the storage; and
   store at least a sub set of the template information in the resource component.

5. The apparatus of claim 1, further comprising a third interface for receiving requests regarding the node resources and for responding to the requests regarding the node resources, wherein the apparatus is configured to:
   receive, using the third interface, a request or query regarding node resources;
   retrieve, using the second interface, the template defining the node resources from the storage based on the pointer to the template stored in the resource component;
   determine the node resources from the template and other information stored in the resource component, and
   respond to the request or query regarding node resources.

6. The apparatus of claim 1, wherein the template comprises information on properties of node resources and node interaction properties.

7. The apparatus of claim 1, wherein the apparatus is configured to:
   receive, using the binary web service interface, a node registration message from a node, the node registration message comprising a coded id comprising parameters of the node registration message;
   request, using the second interface, the decoding of the coded id; and
   receive, using the second interface, information on the parameters corresponding to the coded id.

8. The apparatus of claim 7, wherein the parameters comprise information on properties of the node.

9. An apparatus comprising:
   one or more interfaces to resources configured to provide information;
   a binary web service interface to communicate with a network element operationally connected to the apparatus using a binary web service,
   the apparatus being configured to:
      send the network element a node registration message comprising information on the address of the apparatus, a flag indicating that at least part of the resources of the apparatus are defined in a template and that a template-based node registration is requested, and a node type identification for retrieving a template for the requested template-based node registration.

10. The apparatus of claim 9, wherein the node registration message further comprising information on additional resources not defined in a template.

11. The apparatus of claim 9, wherein the apparatus is configured to:
    receive, using the binary web service interface, a message from the network element that the requested registration with the flag indicating that at least part of the resources of the apparatus were defined in a template was not successful; and send, using the binary web service interface, the network element a registration message without a reference to a template.

12. The apparatus of claim 9, wherein the template comprises information on properties of the resources of a node and interaction properties of a node.

13. The apparatus of claim 9, wherein the apparatus is configured to:
form a coded id indicating information related to the apparatus; and
send the network element the coded id as a part of the node registration message.

14. The apparatus of claim 9, wherein the apparatus is configured to form the coded id by:
combining information related to the apparatus into a string;
calculating a one-way hash function over the string; and
truncating the result to a predetermined length.

15. The apparatus of claim 14, wherein the information related to the apparatus is combined into a string in a predetermined order.

16. A web service system comprising:
a first apparatus that includes:
a first binary web service interface to communicate with nodes operationally connected to the apparatus using a binary web service, the nodes comprising one or more resources, the first binary web service interface being configured to receive, from a node, a node registration message comprising:
information indicating the address of the node sending the node registration message,
a flag indicating that at least part of the resources of the node sending the node registration message are defined in a template, and that a template-based node registration is requested, and
a node type identification for retrieving a template for the requested template-based node registration;
a second interface for retrieving template information based on the node type identification; and
a resource component for storing information on nodes, node addresses, node resources and template information; and
a second apparatus that includes:
one or more resource interfaces configured to provide information;
a second binary web service interface to communicate with a network element operationally connected to the apparatus using a binary web service,
wherein, the network element is sent a registration message comprising information on the address of the second apparatus, a flag indicating that at least part of the resources of the second apparatus are defined in a template and that a template-based registration is requested, and a node type identification for retrieving a template for the requested template-based node registration.

17. A method comprising:
communicating with nodes operationally connected to an apparatus using a binary web service interface, the nodes comprising one or more resources,
receiving, from a node, a node registration message comprising information on the address of the node sending the node registration message, a flag indicating that at least part of the resources of the node sending the node registration message are defined in a template, and that a template-based node registration is requested, and a node type identification for retrieving a template for the requested template-based node registration;
retrieving template information based on the node type identification; and
storing information on nodes, node addresses, node resources and template information on a resource component.

18. The method of claim 17, further the node registration message further comprises information on additional resources not defined in a template.

19. The method of claim 17, further comprising:
requesting, using the second interface template, information from a storage connected to the second interface based on the node type identification after receiving the node registration message;
receiving a pointer to the template stored by the storage; and
storing the pointer to the template in the resource component.

20. The method of claim 17, further comprising:
requesting, using the second interface template, information from a storage connected to the second interface based on the node type identification after receiving the node registration message;
receiving template information stored by the storage; and
storing at least a sub set of the template information in the resource component.

21. The method of claim 17, further comprising:
receiving requests regarding node resources and for responding to the requests,
receiving using a third interface, a request or query regarding node resources;
retrieving, using a second interface, the template defining the node resources from the storage based on the pointer to the template stored in the resource component;
determining the node resources from the template and other information stored in the resource component; and
responding to the node resource request or query.

22. The method of claim 17, further comprising:
receiving, using the binary web service interface, from a node, a node registration message comprising a coded id comprising parameters of the message;
requesting, using the second interface, the decoding of the coded id; and
receiving, using the second interface, information on the parameters corresponding to the coded id.

23. A method, comprising:
registering resources configured to provide information;
communicating with a network element operationally connected to the apparatus using a binary web service; and
sending the network element a registration message comprising information indicating the address of the apparatus, a flag indicating that at least part of the resources to be registered are defined in a template and that a template-based node registration is requested, and a node type identification for retrieving a template for the requested template-based node registration.

24. The method of claim 23, the node registration message further comprises information on additional resources not defined in a template.

25. The method of claim 23, further comprising:
receiving, using a binary web service interface, a message from the network element that registration with the flag indicating that at least part of the resources of the apparatus are defined in a template was not successful; and sending, using the binary web service interface, the network element a registration message without a reference to a template.

26. The method of claim 23, wherein the template comprises information on properties of the node resources and node interaction properties.

27. A non-transitory data carrier carrying processor control code to, when running, perform the following steps:

communicating with nodes operationally connected to the apparatus using a binary web service interface, the nodes comprising one or more resources, receiving, from a node, a node registration message comprising information indicating the address of the node sending the node registration message, a flag indicating that at least part of the resources of the node sending the node registration message are defined in a template and that a template-based registration is requested, and a node type identification for retrieving a template for the requested template-based node registration;

retrieving template information based on the node type identification; and storing information on nodes, node addresses, node resources and template information in a resource component.

* * * * *